United States Patent [19]

Koga

[11] Patent Number: 4,505,613
[45] Date of Patent: Mar. 19, 1985

[54] METHOD FOR LINING PIPES IN PIPELINES

[75] Inventor: Motoyuki Koga, Tokyo, Japan

[73] Assignee: Hakko Co., Ltd., Tokyo, Japan

[21] Appl. No.: 490,093

[22] Filed: Apr. 29, 1983

[30] Foreign Application Priority Data

| Apr. 30, 1982 | [JP] | Japan | 57-74335 |
| Apr. 30, 1982 | [JP] | Japan | 57-74336 |
| Apr. 30, 1982 | [JP] | Japan | 57-74337 |
| Apr. 30, 1982 | [JP] | Japan | 57-74338 |

[51] Int. Cl.³ ............................................. F16L 55/18
[52] U.S. Cl. .................................... 405/154; 118/306; 138/97; 427/236; 427/237; 405/146; 405/150
[58] Field of Search ............... 405/154, 156, 146, 150; 138/97; 118/306; 427/236, 237

[56] References Cited

U.S. PATENT DOCUMENTS

| 2,634,223 | 4/1953 | Clendenin et al. | 427/237 X |
| 2,914,424 | 11/1959 | Murray | 427/237 |
| 3,096,819 | 7/1963 | White et al. | 427/237 X |
| 3,484,276 | 12/1969 | Burggraaf et al. | 427/237 X |
| 3,578,479 | 5/1971 | Packo | 138/97 X |
| 4,237,172 | 12/1980 | Packo et al. | 138/97 X |
| 4,267,291 | 5/1981 | Jones et al. | 427/237 X |

Primary Examiner—Dennis L. Taylor
Attorney, Agent, or Firm—Martin A. Farber

[57] ABSTRACT

A method for lining pipes in a town gas underground pipeline. The method is characterized in that carrier air is flown together with plastics mist passing through a route comprising a branch line for distributing the gas to consumers, so that the pipeline and branch pipe are lined with the plastics.

13 Claims, 5 Drawing Figures

METHOD FOR LINING PIPES IN PIPELINES

BACKGROUND OF THE INVENTION

The present invention relates to a method for lining pipes in an underground pipeline such as town gas pipeline or water pipeline, and more particularly to a method for lining pipes with plastics in order to repair old pipes.

There has been proposed a pipe lining method which comprises flowing carrier air into the pipeline together with thermosetting plastics such as epoxy resin. It will be noted that the town gas pipe line has a plurality of supply pipe or branch pipes for distributing the gas to the consumers. If the carrier air is flown into the pipeline from an end opening and exhausted from the other end of the pipeline, pipes of the underground pipeline are lined with the plastics. However, the branch pipes are hardly lined with plastics.

SUMMARY OF THE INVENTION

The object of the present invention is to provide a method by which an underground pipeline together with branch pipes can be easily lined with plastics.

According to the present invention, there is provided a method for lining pipes in an underground pipeline having a plurality of branch pipes each having an end which opens to the atmosphere comprising: flowing carrier air in pipes passing through at least one of the branch pipes and the underground pipeline; and supplying plastics mist into the pipes by the carrier air.

The present invention will be more apparent from the following description made with reference to the accompanying drawings.

DETAILED DESCRIPTION OF THE PREFERRED EMBODIMENTS

Figure 1:
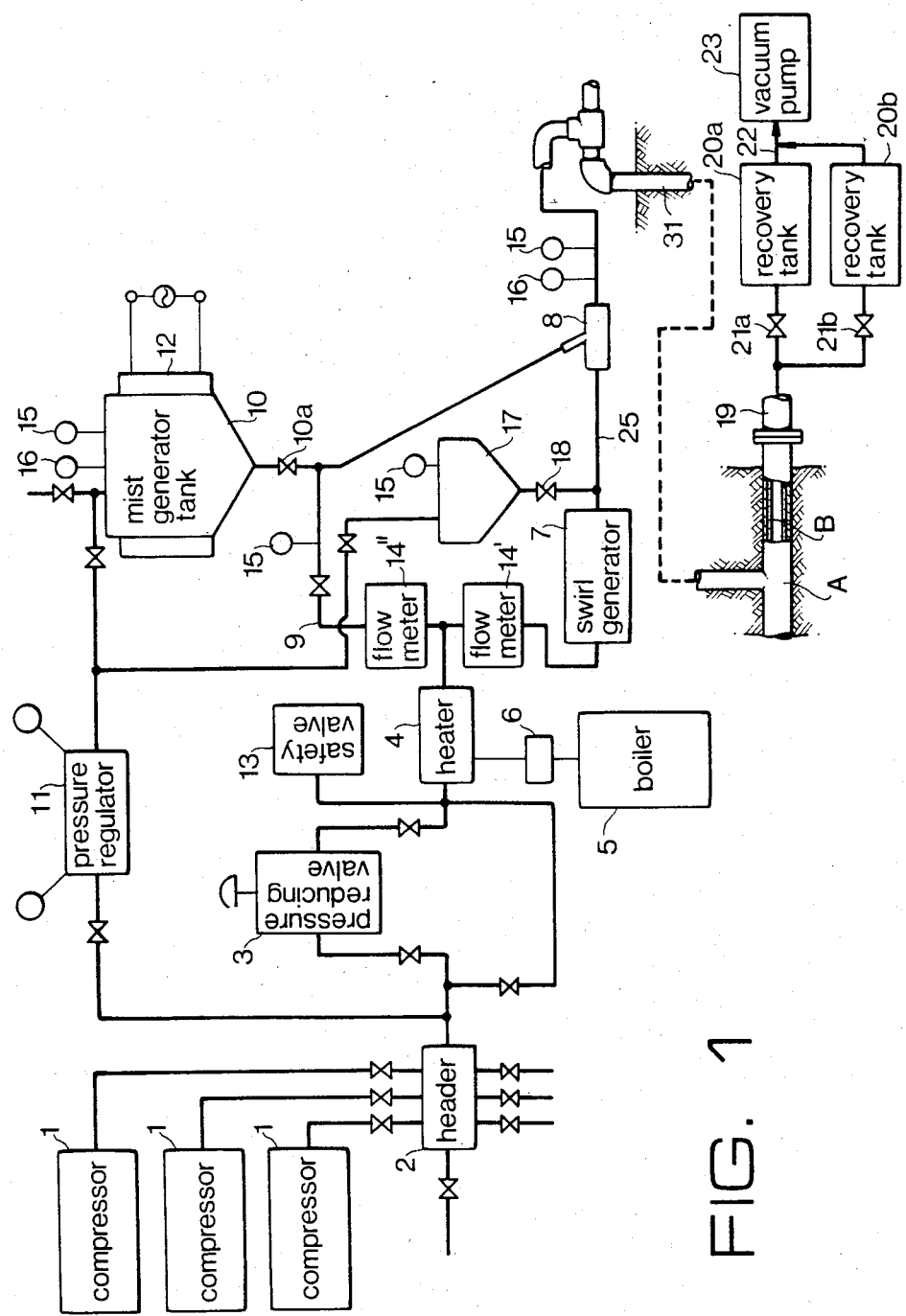
FIG. 1 is a schematic diagram showing a system for using a method according to the present invention.

Referring to FIG. 1, the system for a method according to the present invention is provided with compressors 1 for supplying a carrier air or gas at a low pressure and a vacuum pump 23 for sucking the air in pipes of an underground pipeline A. Outlets of compressors 1 are connected to a header 2 which is in turn communicated with a heater 4 through a pressure reducing valve 3. The heater 4 comprises a heat exchanger and is supplied with steam from a boiler 5 through a pressure reducing valve 6 so as to heat the air passing therethrough. Thus, the heater 4 supplies hot carrier air at a low pressure, for example 0.3 Kg/cm$^2$. A portion of this carrier air is fed to a confluent head 8 through a volumetric flow meter 14', swirl generator 7 and pipe 25. The head 8 is outputted to an end opening of a branch pipe 31 of the pipeline A.

On the other hand, a part of compressed air from the header 2 is fed to a mist generator tank 10 through a pressure regulator 11. In the tank 10, melted thermosetting plastics such as epoxy resin is stored and heated by an electric heater 12 to keep viscosity of the plastics in a low value. Also a part of hot carrier air from the heater 4 passes through volumetric flow meter 14'' and a pipe 9 to the confluent head 8. The melted plastics in the tank 10 is injected into the pipe 9 by means of the compressed air from the header 2, so that the melted plastics is pulverized in the pipe 9 and carried to the head 8.

The system is further provided with an abrasive grain or grit tank 17 which is communicated with an outlet of the pressure regulator 11 and with the pipe 25 through a valve 18. Grits in the tank 17 are used for grit-blasting inner walls of pipes of the underground pipeline A. The system is further provided with a safety valve 13, pressure meters 15, and thermometers 16. To an end of the pipeline A, a recovery tank 20a for recovering the mist of plastics and a recovery tank 20b for abrasive grain are connected by a pipe 19 through valves 21a and 21b, respectively. The vacuum pump 23 is connected to the tankers 20a and 20b by a pipe 22.

Figure 2:
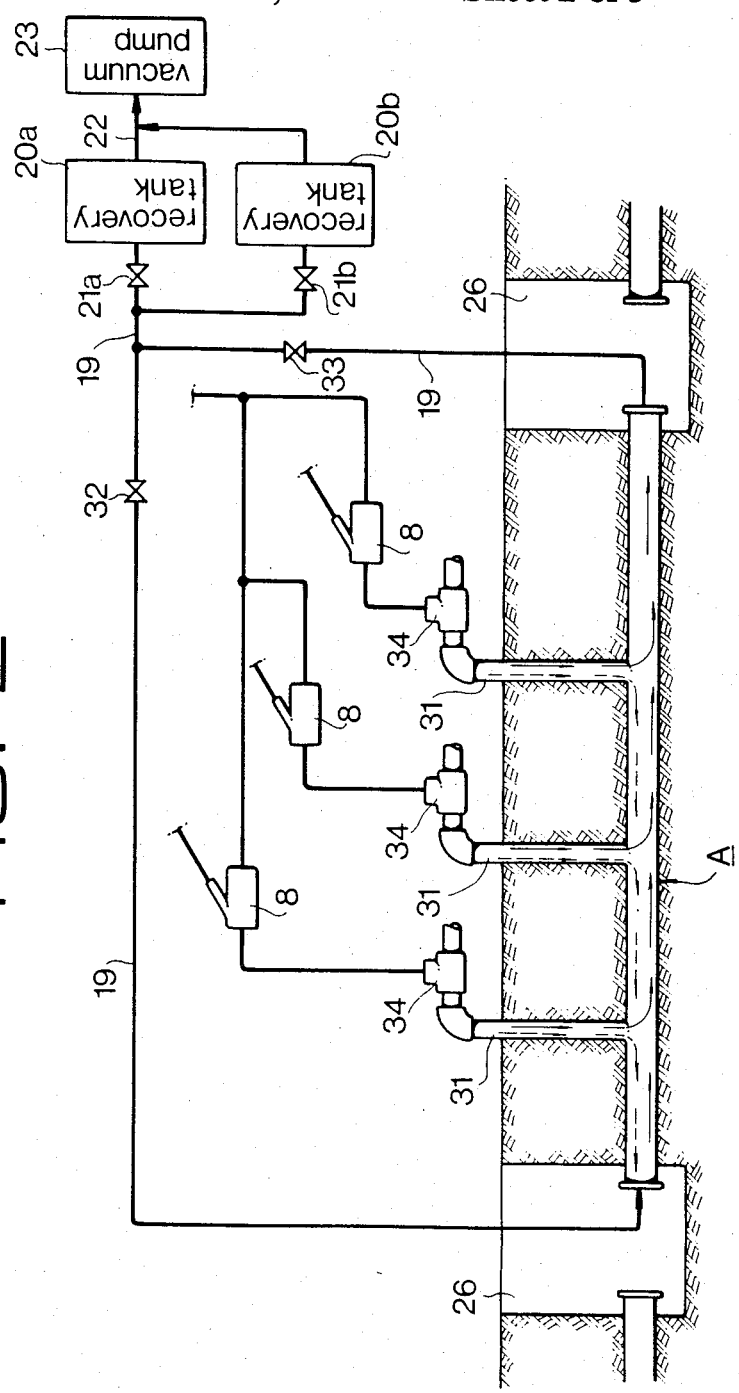
FIG. 2 shows an embodiment of the present invention.

As shown in FIG. 2, heads 8 are connected to a plurality of branches 31 by connectors 34 at ends which are projected above the ground for consumers. On the other hand, the pipe 19 is connected to the end of the pipeline in a pit or access hole 26 such as a manhole.

In operation of the system of FIG. 1, the valve 21a is opened and valve 21b is closed. Compressors 1 and vacuum pump 23 are operated to produce air stream in branch pipes 31 and pipeline A. The air is heated by the heater 4, so that inner walls of the pipes are dried and heated.

In case of very old pipes, it is preferable to remove dirt, rust and others from the inner walls of the pipes. To this end, before the line with plastics, the valve 21a is closed and valve 21b is opened, and valve 18 is opened, so that grits in the tank 17 are injected into the pipes by carrier air at a high pressure in order to perform grit-blasting. Grits discharged from the pipeline are recovered in the tank 20b. Thereafter, valve 21b is closed, valve 21a is opened, valve 18 is closed, and valve 10a is opened. Thus, air supplied by compressors 1 at a low pressure acts to inject melted plastics in the tank 10 into the pipe 9 to form mist of the plastics. The mist of the plastics is fed to the head 8 and carried to branches 31 and to the pipeline A by the hot carrier air supplied from the heater 4. On the other hand, the vacuum pump 23 draws air in the pipes to provide a low vacuum pressure, for example, about −0.3 Kg/cm$^2$. Thus, the mist of plastics is carried through the branches and the pipeline by the carrier air. Thus, a liner B is formed on inner walls of the pipes. Residual mist is recovered in the tank 20a.

By the swirl generator 7, the carrier air swirls in the branch pipes 31 and pipe line A, so that effective gritblasting and uniform lining are carried out.

Referring to FIG. 2, both ends of the pipeline A are connected to the vacuum pump 23 through valves 32 and 33, respectively. Accordingly, if the valve 32 is closed and valve 33 is opened, the carrier air passes through branch pipes 31 and pipeline A as shown by arrows of solid lines. If valve 32 is opened and valve 33 is closed, the air passes as shown by dotted lines. Thus, pipes are surely lined with plastics. Although, in the system of FIG. 2, three branch pipes are lined, the system may be used for lining only a single branch pipe or more than three pipes.

Further, it will be understood that the carrier air stream can be provided only by a compressor or by a vacuum pump at proper pressure.

Figure 3:
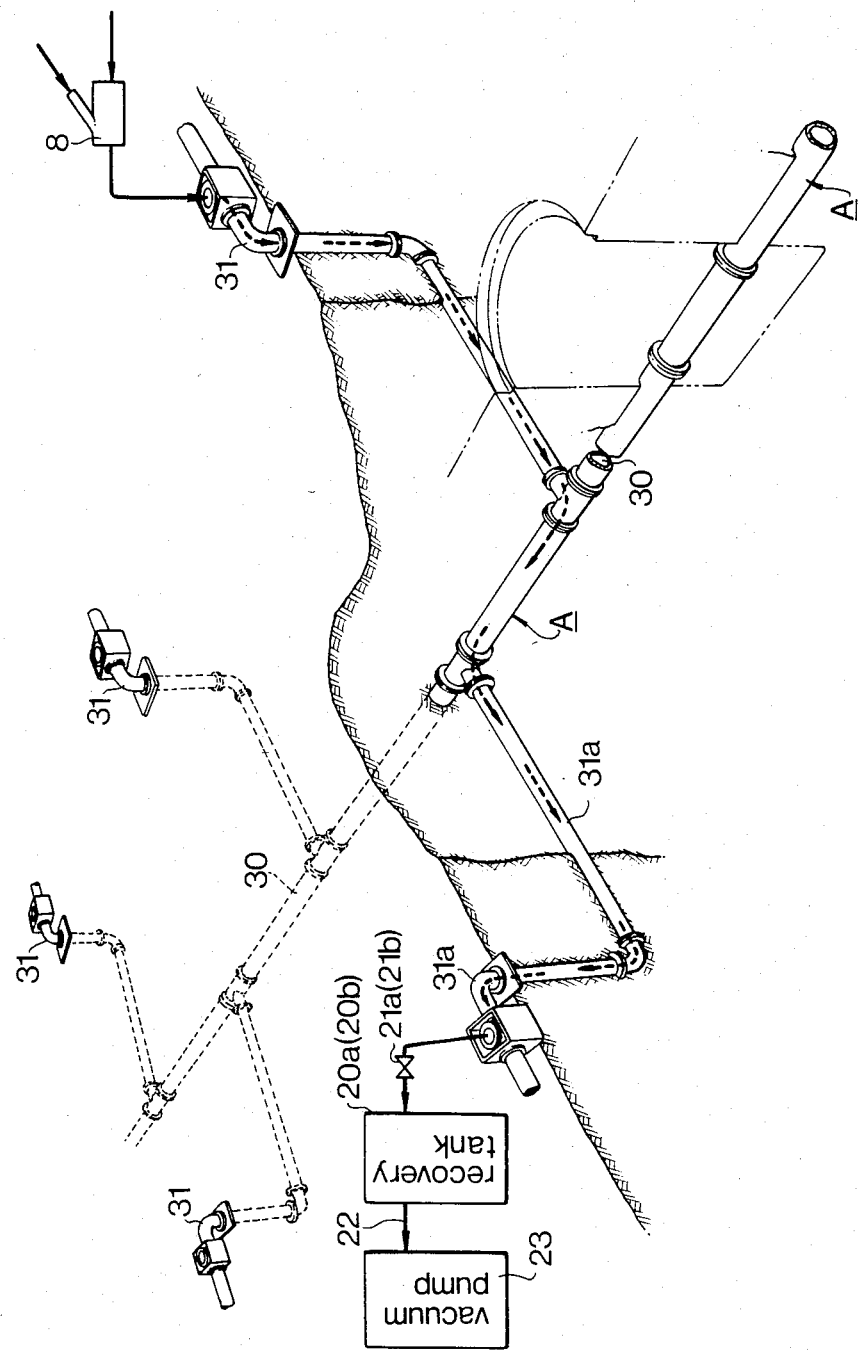
FIGS. 3 to 5 show other embodiments of the present invention, respectively.

Referring to FIG. 3 showing another embodiment of the present invention, in the system, the vacuum pump 23 is connected to an end of a branch pipe 31a at above the ground through valves 21a, 21b, tanks 20a, 20b. Other construction of the system is the same as FIG. 1. Therefore, the carrier air passes through branch pipe 31, pipeline A and branch pipe 31a.

Figure 4:
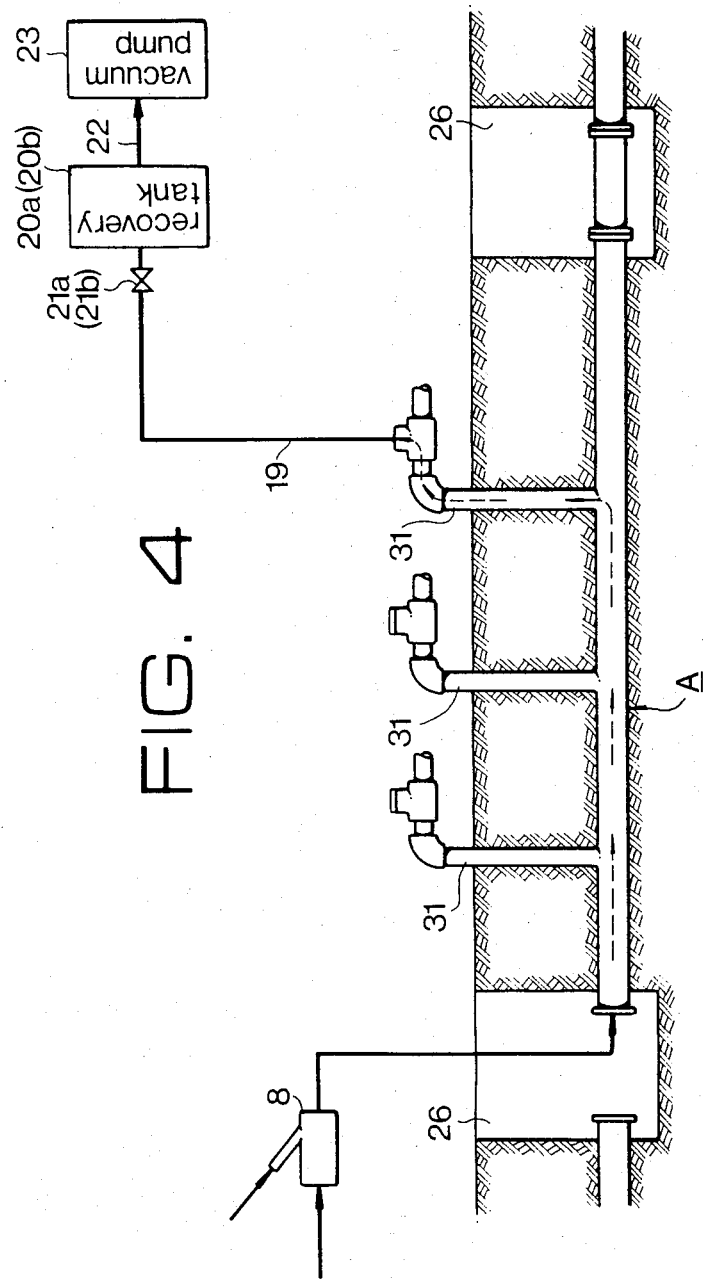

In the system shown in FIG. 4, the head 8 is connected to an end of the pipeline A at the pit 26 and the vacuum pump 23 is communicated with an end opening of one of branch pipes 31 through valves 21a, 21b and tanks 20a, 20b. Thus, the carrier air flows through pipes of the pipeline A and branch pipe 31 as shown by arrows.

Figure 5:
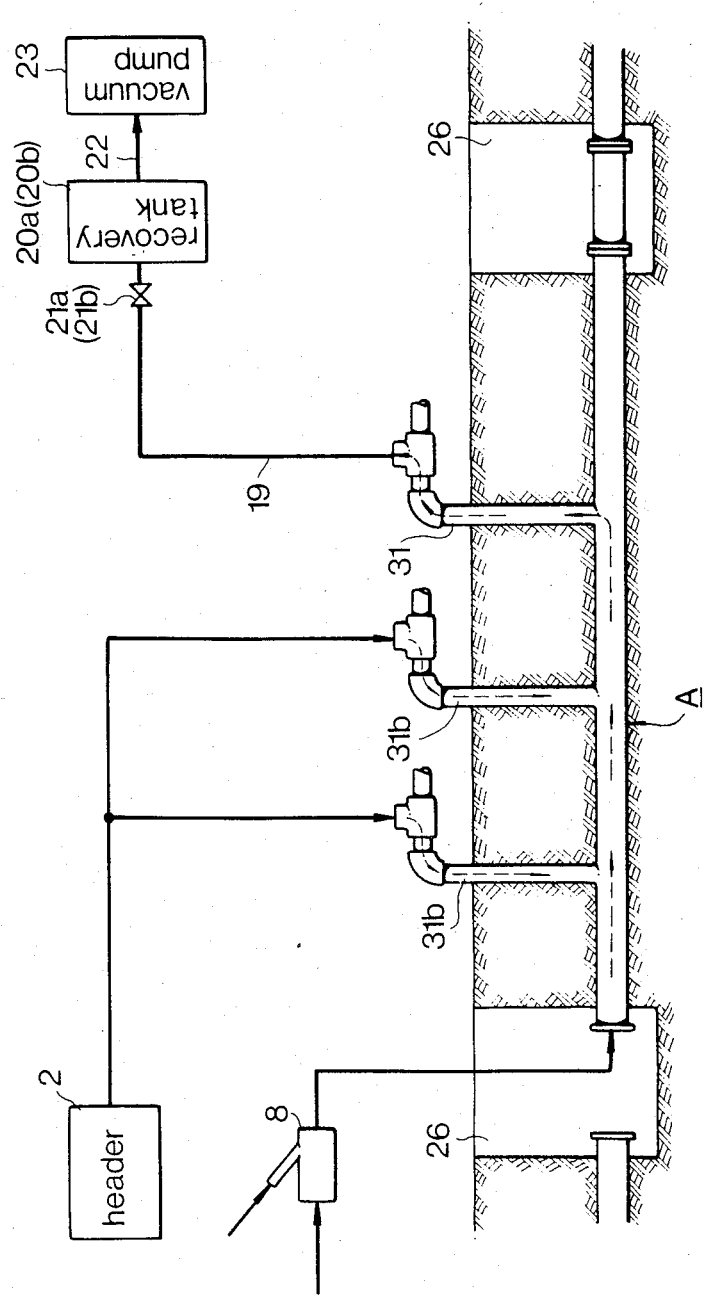

The system of FIG. 5 is a modification of the system of FIG. 4. In this system, end openings of branch pipes 31b which are not treated are connected to the header 2 to supply air to the branches 31 at a proper pressure. In accordance with this system, since air which does not carry the plastics mist is supplied to branches 31b, mist of plastics does not stick to walls of junctions of these branch pipes and the pipeline. Therefore, it is possible to prevent the blocking of branch pipes with plastics.

From the foregoings it will be understood that the present invention provides a method which may treat a complex pipeline, since the carrier air flows a predetermined route. Further, the method of the present invention can be easily carried out by using a branch pipe end opening to the atmosphere without digging a hole in order to connect an carrier air pipe to an end of a pipe.

While the presently preferred embodiment of the present invention has been shown and described, it is to be understood that this disclosure is for the purpose of illustration and that various changes and modifications may be made without departing from the spirit and scope of the invention as set forth in the appended claim.

What is claimed is:

1. A method for lining cooperating pipes of an underground pipeline which pipeline includes a plurality of branch pipes each having an end which opens to the atmosphere, comprising the steps of:
   flowing carrier air in said cooperating pipes and through at least one of said branch pipes and said pipeline;
   supplying plastics mist in said cooperating pipes via said carrier air;
   discharging said carrier air together with said plastics mist out of said cooperating pipes; and
   recovering said plastics mist into a plastics mist recovery tank.

2. The method according to claim 1, wherein said carrier air is introduced into said pipeline via at least one of said branch pipes at an end thereof.

3. The method according to claim 1, wherein said carrier air is introduced into said pipeline via an end of the pipeline and is discharged from an end of a branch pipe.

4. The method according to claim 2, wherein said carrier air is discharged from an end of the pipeline.

5. The method according to claim 2, wherein said carrier air is discharged from an end of a branch pipe.

6. The method according to claim 1, wherein said carrier air is flowed into some but not all of said branch pipes and further comprising introducing compressed air into said pipeline via at least one of said branch pipes in which said carrier has not been flowed.

7. The method according to claim 1, further comprising
   supplying abrasive grit in said cooperating pipes via said carrier air;
   discharging said carrier air together with said abrasive grit out of said cooperating pipes; and
   recovering said abrasive grit into a grit recovery tank.

8. A method for lining cooperating pipes of an underground pipeline which pipeline includes a plurality of branch pipes each having an end which opens to the atmosphere, comprising:
   flowing carrier air in said cooperating pipes and through at least one of said branch pipes and said pipeline;
   supplying abrasive grit in said cooperating pipes via said carrier air;
   discharging said carrier air together with said abrasive grit out of said cooperating pipes;
   recovering said abrasive grit into a grit recovery tank;
   supplying plastics mist in said cooperating pipes via said carrier air;
   discharging said carrier air together with said plastics mist out of said cooperating pipes; and
   recovering said plastics mist into a plastics mist recovery tank.

9. The method according to claim 8, wherein said carrier air is introduced into said pipeline via at least one of said branch pipes at an end thereof.

10. The method according to claim 8, wherein said carrier air is introduced into said pipeline via an end of the pipeline and is discharged from an end of a branch pipe.

11. The method according to claim 9, wherein said carrier air is discharged from an end of the pipeline.

12. The method according to claim 9, wherein said carrier air is discharged from an end of a branch pipe.

13. The method according to claim 8, wherein said carrier air is flowed into some but not all of said branch pipes and further comprising introducing compressed air into said pipeline via at least one of said branch pipes in which said carrier has not been flowed.

* * * * *